(12) United States Patent
Hwang

(10) Patent No.: US 10,199,619 B2
(45) Date of Patent: Feb. 5, 2019

(54) SECONDARY BATTERY WITH FRAME UNIT

(71) Applicant: SAMSUNG SDI CO., LTD., Yongin-si, Gyeonggi-do (KR)

(72) Inventor: Seon-Hee Hwang, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 382 days.

(21) Appl. No.: 14/825,250

(22) Filed: Aug. 13, 2015

(65) Prior Publication Data

US 2016/0072160 A1 Mar. 10, 2016

(30) Foreign Application Priority Data

Sep. 4, 2014 (KR) .................. 10-2014-0117671

(51) Int. Cl.
*H01M 2/26* (2006.01)
*H01M 2/10* (2006.01)
*H01M 2/02* (2006.01)

(52) U.S. Cl.
CPC ......... *H01M 2/1061* (2013.01); *H01M 2/026* (2013.01); *H01M 2/0217* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2006/0244416 A1 | 11/2006 | Yong et al. | |
| 2007/0148480 A1* | 6/2007 | Ishiwata | B32B 7/12 428/473.5 |
| 2008/0305367 A1 | 12/2008 | Baek et al. | |
| 2012/0219847 A1 | 8/2012 | Hong et al. | |

FOREIGN PATENT DOCUMENTS

| | | | |
|---|---|---|---|
| JP | 2004327176 A | * | 11/2004 |
| JP | 2005158452 A | * | 6/2005 |
| KR | 10-2006-0105208 A | | 10/2006 |
| KR | 10-2008-0107185 A | | 12/2008 |
| KR | 10-2012-0097312 A | | 9/2012 |

OTHER PUBLICATIONS

Machine Translation for JP 2004327176 A (Nov. 2004).*
Machine Translation for JP 2005158452 A (Jun. 2005).*

* cited by examiner

*Primary Examiner* — Tracy M Dove
(74) *Attorney, Agent, or Firm* — Lee & Morse P.C.

(57) ABSTRACT

Provided is a secondary battery, including a battery cell; a frame unit surrounding the battery cell; an adhesive portion overlapping the battery cell and the frame unit and attached to the battery cell; and a label unit covering at least portions of the battery cell and the frame unit, at least a portion of the label unit overlapping the adhesive portion.

17 Claims, 4 Drawing Sheets

SECONDARY BATTERY WITH FRAME UNIT

CROSS-REFERENCE TO RELATED APPLICATION

Korean Patent Application No. 10-2014-0117671, filed on Sep. 4, 2014, in the Korean Intellectual Property Office, and entitled: "Secondary Battery," is incorporated by reference herein in its entirety.

BACKGROUND

1. Field

Embodiments relate to a secondary battery.

2. Description of the Related Art

Secondary batteries may be employed in various ways as power sources for portable electronic devices. Mobile electronic devices may be used in various fields, and demand for secondary batteries may increase. Secondary batteries, which may be rechargeable, may be re-used, which may be economical and environmentally friendly, and use of secondary batteries may be encouraged.

SUMMARY

Embodiments may be realized by providing a secondary battery, including a battery cell; a frame unit surrounding the battery cell; an adhesive portion overlapping the battery cell and the frame unit and attached to the battery cell; and a label unit covering at least portions of the battery cell and the frame unit, at least a portion of the label unit overlapping the adhesive portion.

The adhesive portion may be attached to the battery cell and the frame unit.

The adhesive portion may include a substrate layer; and an adhesive layer between the substrate layer and the battery cell, or the battery cell and the frame unit.

The substrate layer may include a polyimide based compound and the adhesive layer may include a silicone based compound.

The adhesive portion may be attached to a first side of the battery cell.

The adhesive portion may be attached to a first side of the frame unit adjacent to the first side of the battery cell.

The label unit may be at least partially attached to the adhesive portion via the frame unit from a second side opposite to the first side of the battery cell.

The label unit may be attached to the second side of the battery cell.

The label unit may be at least partially not attached to the frame unit.

The label unit may include a body area and at least one extension area extending from the body area, at least a portion of the body area may be attached to a second side opposite to the first side of the battery cell, and the extension area may be attached to the adhesive portion by covering the frame unit.

The label unit may include a plurality of extension areas, and some of the extension areas may be attached to the adhesive portion and remaining areas may be attached to the first side of the battery cell.

The adhesive portion may expose at least a portion of the first side of the battery cell to outside.

The label unit may include a substrate layer and an adhesive layer, the adhesive layer may include an opening area, and the opening area may be between the substrate layer and at least a portion of the frame unit.

The secondary battery may include a space between the battery cell and the frame unit. The adhesive portion may cover the space.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
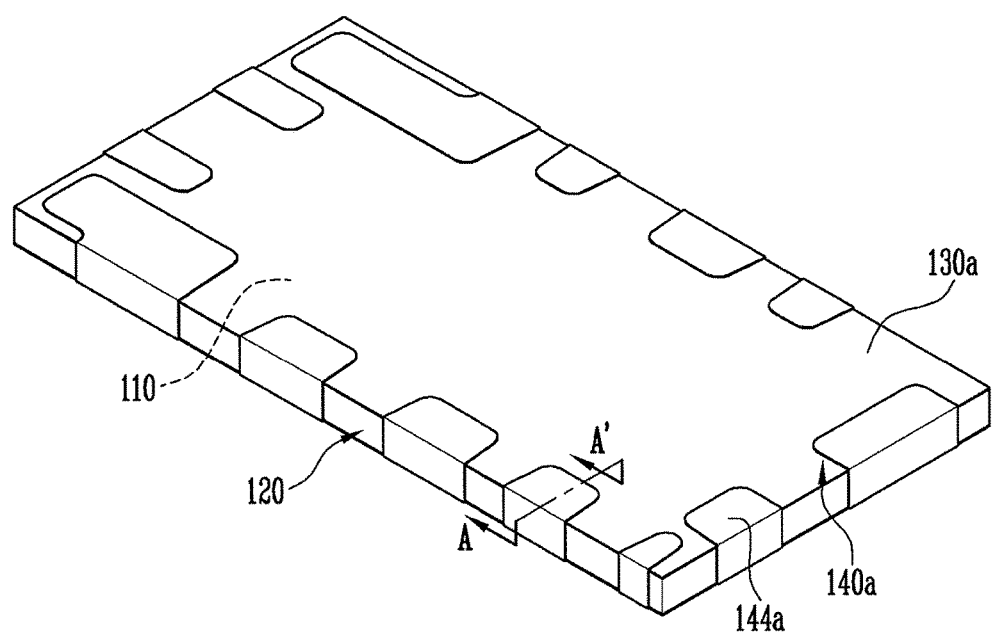
FIG. 1 illustrates a perspective view of a secondary battery according to a first embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In addition, when an element is referred to as being "on" another element, it can be directly on the other element or be indirectly on the other element with one or more intervening elements interposed therebetween. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Also, when an element is referred to as being "connected to" another element, it can be directly connected to the other element or be indirectly connected to the other element with one or more intervening elements interposed therebetween. Hereinafter, like reference numerals refer to like elements. In the drawings, the thickness or size of layers are exaggerated for clarity and not necessarily drawn to scale.

Figure 2:
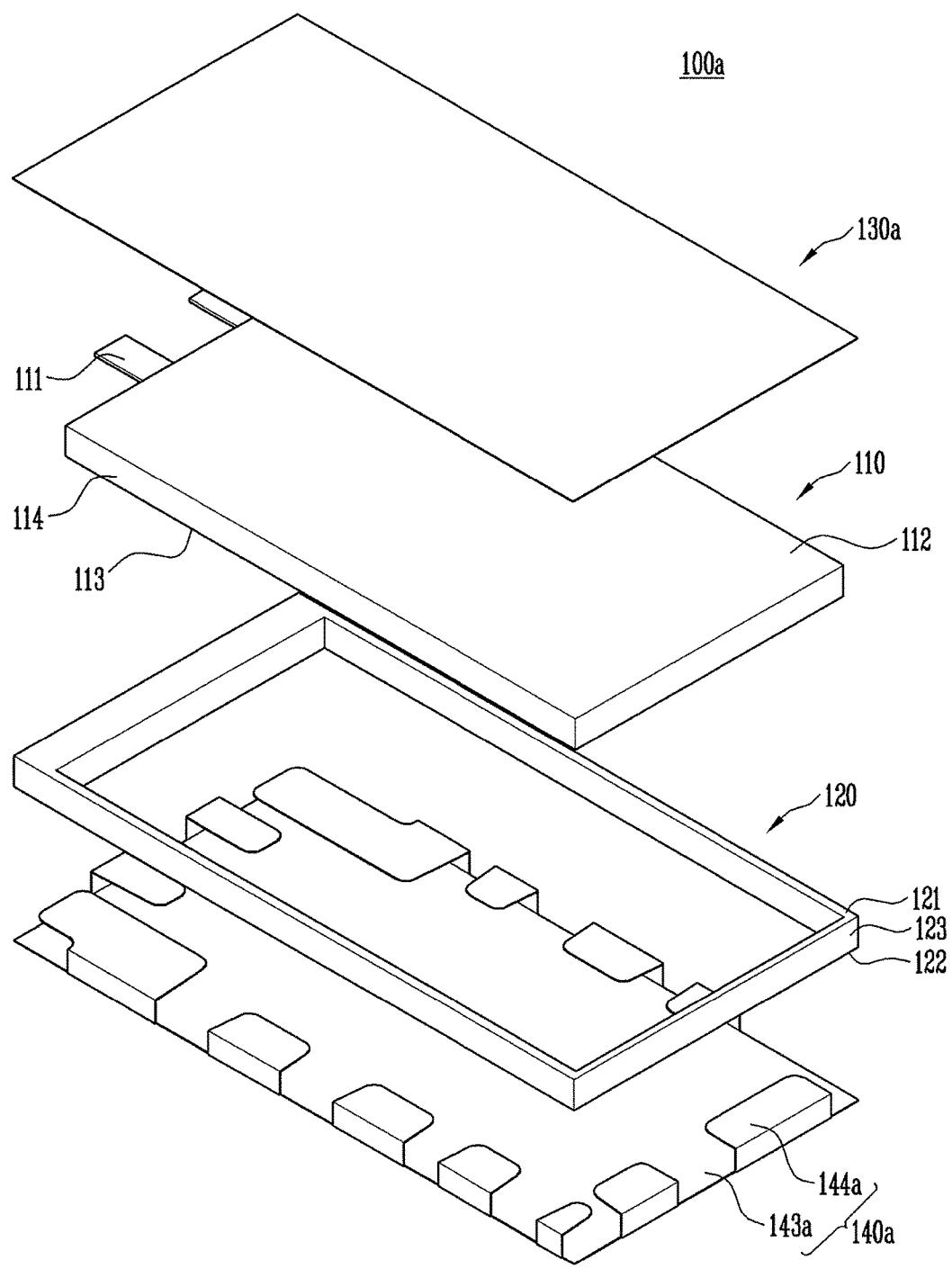
FIG. 2 illustrates an exploded oblique view of the secondary battery shown in FIG. 1.

FIG. 1 illustrates a perspective view of a secondary battery 100a according to a first embodiment. FIG. 2 illustrates an exploded oblique view of the secondary battery 100a shown in FIG. 1. The secondary battery 100a according to an embodiment is described with reference to FIGS. 1 and 2.

As shown in FIGS. 1 and 2, the secondary battery 100a according to an embodiment may include a battery cell 110, a frame unit 120 surrounding the battery cell 110, an adhesive portion 130a that overlaps the battery cell 110 and the frame unit 120, and a label unit 140a covering the battery cell 110 and the frame unit 120.

The battery cell 110 is a member that turns chemical energy into electrical energy.

The battery cell 110 may include a battery case having one side that is open and an electrode assembly and electrolyte in the battery case. The electrode assembly and the electrolyte may generate electrical energy by having electrochemical reaction, and the battery case may be sealed by one side of the battery cell 110 that includes, for example, a cap assembly. The battery cell 110 may include a terminal unit 111 having different polarities, i.e., positive and negative terminals. Exemplary shapes and structures of the battery cell 110 include, for example, an angular or pouch shape.

The battery cell 110 may have, for example, an approximately rectangular parallelepiped shape. A first side 112 and a second side 113 that are the largest surfaces of the battery cell 110 may be opposite to each other. The terminal unit 111 may project, e.g., extend, from any one of sides 114 that couples the first side 112 and the second side 113.

The frame unit 120 may be a member that protects the battery cell 110 and may be surround the battery cell 110.

In an embodiment, the frame unit 120 may have a shape that covers at least one side 114 of the four sides 114 of the battery cell 110 or that covers side 114 and first side 112 and even, e.g., a boundary of, second side 113. For example, the frame unit 120 may have a shape in which both sides are open, the battery cell 110 may be provided within such shape, an impact may be made on the secondary battery 100a, and the battery cell 110 may be protected from the impact. The frame unit 120 may include a first side 121 and a second side 122 adjacent to the first side 112 and the second side 113, respectively, and a side 123 that couples the first side 121 and the second side 122. The first side 121 and the second side 122 of the frame unit 120 may be roughly parallel to the first side 112 and the second side 113 of the battery cell 110, respectively.

The frame unit 120 may be provided to surround the battery cell 110 such that the frame unit 120 fits tightly against the battery cell 110 or a space 124 (refer to FIG. 3) may be provided between the frame unit 120 fits and the battery cell 110. The space 124 may be intended or may be made due to tolerance.

Figure 3:
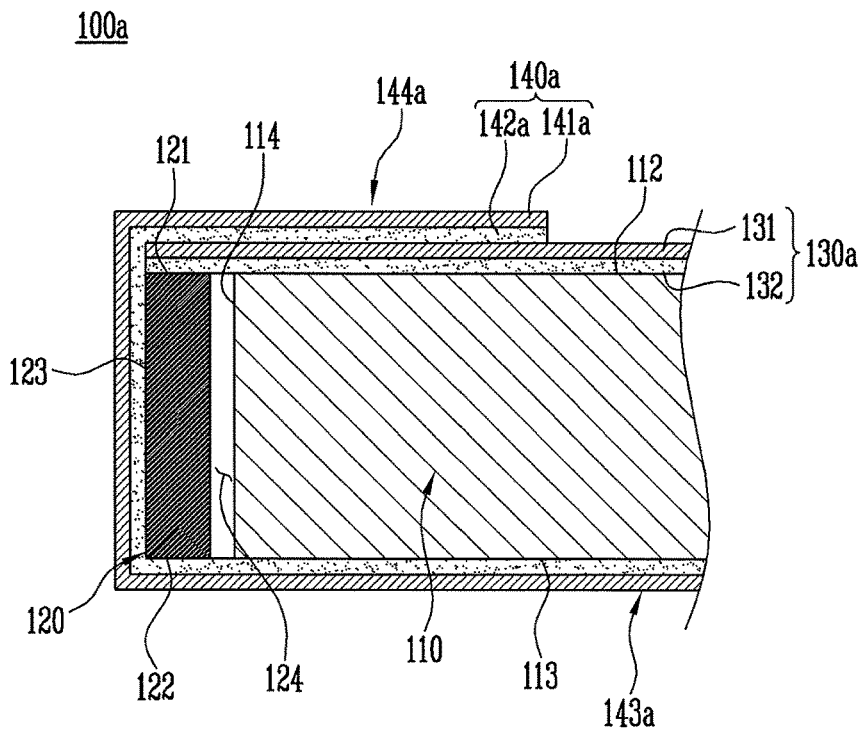
FIG. 3 illustrates a sectional view taken along line A-A' of FIG. 1.

FIG. 3 illustrates a sectional view taken along line A-A' of FIG. 1. The adhesive portion 130a and the label unit 140a according to an embodiment are described with reference to FIG. 3.

The adhesive portion 130a may be a member that is attached to the battery cell 110 and overlaps the frame unit 120 and the battery cell 110.

The adhesive portion 130a may be attached to the first side 112 of the battery cell 110 and may overlaps the first side 112 of the battery cell 110 and the first side 121 of the frame unit 120. In an embodiment, the adhesive portion 130a may be attached to both the first side 112 of the battery cell 110 and the first side 121 of the frame unit 120. The adhesive portion 130a may include a first substrate layer 131 and a first adhesive layer 132. The adhesive portion 130a may cause the first adhesive layer 132 to be provided between the first substrate layer 131 and the first side 112 of the battery cell 110 and/or between the first substrate layer 131 and the first side 121 of the frame unit 120, and the adhesive portion 130a may be attached to the first side 112 of the battery cell 110 and/or the first side 121 of the frame unit 120. The first substrate layer 131 may include polyimide based compound, and the first adhesive layer 132 may include silicone based compound. In an embodiment, the adhesive portion 130a may cover the entire first side 112 of the battery cell 110 (i.e., the adhesive portion 130a may be coextensive with the entire first side 112 of the battery cell 110), or the first side 112 of the battery cell 110 and the first side 121 of the frame unit (i.e., the adhesive portion 130a may be coextensive with the first side 112 of the battery cell 110 and the first side 121 of the frame unit). In this embodiment, the first side 112 of the battery cell 110 or the first side 112 of the battery cell 110 and the first side 121 of the frame unit 120 may not be exposed to outside by the adhesive portion 130a.

As described above, there may be the space 124 between the battery cell 110 and the frame unit 120. The adhesive portion 130a may overlap the battery cell 110 and the frame unit 120. The adhesive portion 130a may cover the space 124, the space 124 may not be exposed to outside, coherence between the battery cell 110 and the frame unit 120 may be further enhanced, and an external appearance may be made neat and efficient.

The label unit 140a may be a member that covers at least portions of the battery cell 110 and the frame unit 120. At least a portion of the label unit may overlap the adhesive portion 130a.

The label unit 140a may improve coherence between the battery cell 110 and the frame unit 120 while covering the battery cell 110 and the frame unit 120 and may protect them. The label unit 140a may display information such as, for example, a trademark, on an external surface. The label unit 140a in an embodiment may be attached to the battery cell 110, the frame unit 120, and the adhesive portion 130a and may protect the three components and may make coherence to each other stronger. The label unit 140a may include a second substrate layer 141a and a second adhesive layer 142a. The second adhesive layer 142a may be provided between the second substrate layer 141a and the battery cell 110, the frame unit 120 or the adhesive portion 130a to attach the label unit 140a to the three components.

The label unit 140a may extend while being bent at certain locations, starting from the second side 113 of the battery cell 110 in a direction towards a first side 112 of the battery cell 110 via the frame unit 120. The label unit 140a may include a body area 143a that is attached to the second side 113 of the battery cell 110 and an extension area 144a that extends from the body area 143a. The extension area 144a may extend from the body area 143a and reach the adhesive portion 130a by covering the second side 122 and the side 123 of the frame unit 120 sequentially. The body area 143a may be provided not only on the second side 113 of the battery cell 110, but also through the second side 122 of the frame unit 120. The extension area 144a may bend and extend, or extend while being bent at certain locations, from the body area 143a and reach the adhesive portion 130a by covering the side 23 of the frame unit 120. For example, the body area 143a may be attached to the second side 113 of the battery cell 110 or the second side 113 of the battery cell 110 and the second side 122 of the frame unit 120. The extension area 144a may be attached to the second side 122 of the frame unit 120, the side 123, and the adhesive portion 130a, or the side 123 of the frame unit 120 and the adhesive portion 130a. There may be plural extension areas 144a, each of which may have a shape where it extends from the body area 143a.

Figure 4:
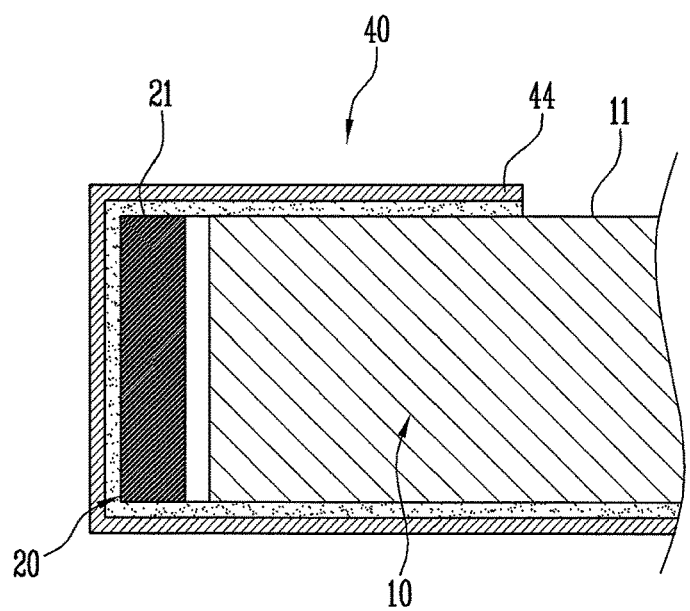
FIG. 4 illustrates a sectional view of a comparative secondary battery.

FIG. 4 illustrates a sectional view of a comparative secondary battery. The adhesive portion 130a and the label unit 140a of the secondary battery 100a according to an embodiment are described with reference to FIG. 4.

If, as shown in FIG. 4, a comparative secondary battery does not include the adhesive portion 130a, an extension area 44 of a label unit 40 may be attached to a first side 11 of a battery cell 10 directly. Noise may be generated as the label unit 40 is repeatedly detached and attached to the battery cell 10 and the frame unit 20 when a torsion stress is applied to the comparative secondary battery. For example, the noise may be the greatest and may be generated the most when the label unit 40 is repeatedly detached and attached to a first side 21 of the frame unit 20, and a user of an electronic device with the comparative secondary battery may be inconvenienced as noise is generated while the electronic device is in use.

The secondary battery 100a according to an embodiment as shown in FIGS. 1 to 3 may reduce noise that may be generated while the secondary battery is being used. The label unit 140a according to an embodiment may not be in direct contact with the first side 121 of the frame unit 120 due to the adhesive portion 130a, and the secondary battery 100a according to an embodiment may have a structure in which noise is not generated as the label unit 140a is repeatedly detached and attached to the first side 121 of the frame unit 120. The label unit 140a may be attached not to the first side 121 of the frame unit 120 but to the adhesive portion 130a on the first side 121 of the frame unit 120. The first substrate layer 131, which may include polyimide based compound, may be attached to the second adhesive layer 142a, and the adhesive force of the label unit 140a and the first substrate layer 131 may be stronger compared to when an area of a label unit is attached to the first side 121 of the frame unit 120. It may be difficult to separate the label unit 140a from the first substrate layer 131 of the adhesive portion 130a, and the possibility of noise being generated due to the label unit 140a and the first substrate layer 131 may be relatively low. There may be a concern that noise may be generated as the adhesive portion 130a is separated from the first side 121 of the frame unit 120. The first adhesive layer 132 of the adhesive portion 130a may be made of a silicone based compound, for example, the possibility that the adhesive portion 130a may be separated from the first side 121 of the frame unit 120 may be relatively reduced compared to when the first adhesive layer 132 is acryl based compound, and the possibility that the noise may be generated may be greatly reduced.

Figure 5:
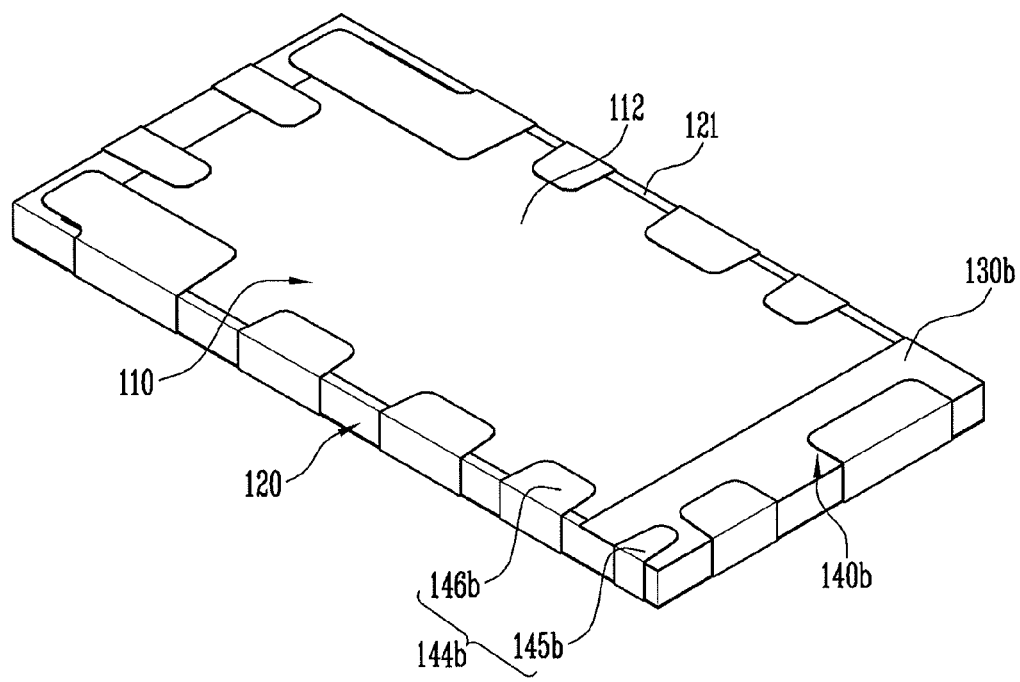
FIG. 5 illustrates a perspective view of a secondary battery according to another embodiment.

FIG. 5 illustrates a perspective view of a secondary battery according to another embodiment. A secondary battery 100b according to an embodiment is described with reference to FIG. 5. The same or corresponding components are referred to using the same reference numerals. Repeated description is omitted.

The secondary battery 100b according to an embodiment may include the battery cell 110, the frame unit 120, an adhesive portion 130b and a label unit 140b. There may be plural extension areas 144b. Some of the extension areas 144b of the label unit 140b may be attached to the adhesive portion 130b while others may be attached to the first side 112 of the battery cell 110. The extension area 144b of the label unit 140b may include a first extension area 145b and a second extension area 146b. The first extension area 145b may, as in the previous embodiment, extend, while being bent at certain locations, from the body area and be attached to the adhesive portion 130b. The second extension area 146b may bend and extend from the body area but may be attached to the first side 112 of the battery cell 110, the adhesive portion 130b may have a shape in which some, not all, of the first side 112 of the battery cell 110 and the first side 121 of the frame unit 120 are covered, and the first extension area 145b that is attached to the adhesive portion 130b may be distinguished from the second extension area 146b that is attached to the first side 112 of the battery cell 110.

In an embodiment, the adhesive portion 130b covers only some of the first side 112 of the battery cell 110 and the first side 121 of the frame unit 120, and the secondary battery 100b may be more economically manufactured. Considering that the location where the aforementioned noise is generated the greatest is a location that is opposite to where the terminal unit 111 is, by placing the adhesive portion 130b at where the noise is generated the greatest as shown in FIG. 5, the noise may be relatively minimized due to size reduction of the adhesive portion 130b.

Figure 6:
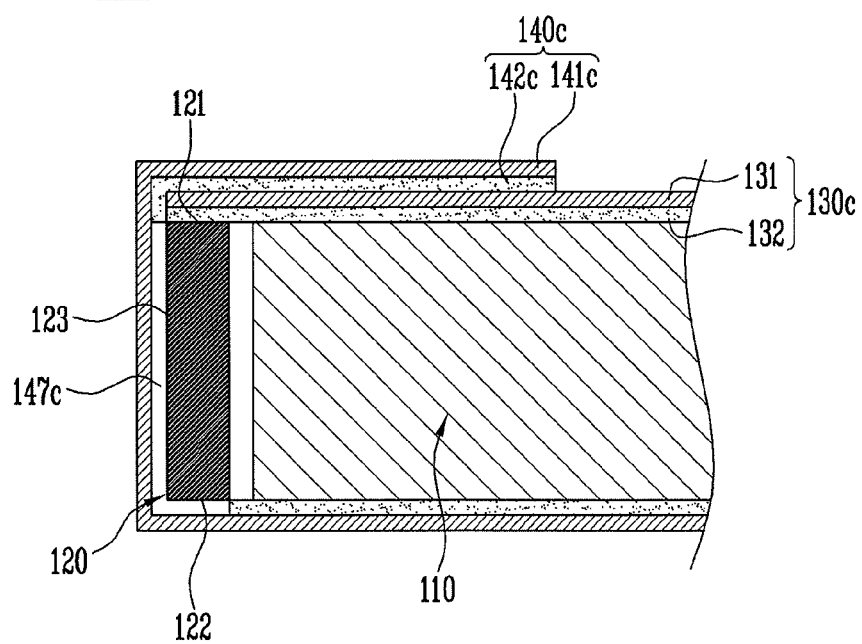
FIG. 6 illustrates a sectional view of a secondary battery according to another embodiment.

FIG. 6 illustrates a sectional view of a secondary battery according to another embodiment. A secondary battery 100c according to an embodiment is described with reference to FIG. 6. The same or corresponding components are referred to using the same reference numerals. Repeated description is omitted.

As shown in FIG. 6, the secondary battery 100c according to an embodiment may include the battery cell 110, the frame unit 120, an adhesive portion 130c, a second substrate layer 141c and a label unit 140c including a second adhesive layer 142c. The second adhesive layer 142c of the label unit 140c may include an opening area 147c. In the secondary battery 100c according to an embodiment, the label unit 140c may be attached to the adhesive portion 130c, or the adhesive portion 130c and the battery cell 110. The label unit 140c may not be attached to at least some of the frame unit 120, and there may be the opening area 147c where there may be adhesive on the second adhesive layer 142c of the label unit 140c. The opening area 147c may be provided between at least a portion of the frame unit 120 and a second substrate layer 141c of the label unit 140c. For example, as shown in FIG. 6, the opening area 147c may be formed at an area which corresponds to the side 123 and the second side 122 of the frame unit 120 such that the label unit 140c is not at all in contact with the frame unit 120. In an embodiment, the opening area 147c may be formed at an area which corresponds to the side 123 of the frame unit 120 such that the label unit 140c is attached to only the second side 122 of the frame unit 120 and is not attached to the remaining.

An embodiment for minimizing adhesion of the label unit 140c and the frame unit 120 is related to the aforementioned noise because the noise may be generated as the label unit 140c is repeatedly detached and attached to the frame unit 120 as torsional stress is applied to the secondary battery 100c.

By way of summation and review, secondary batteries may generate noise, due to, for example, impact of distortion, while in use, and users may be inconvenienced.

Provided is a secondary battery that may include a frame unit and an adhesive portion overlapping the battery cell, and noise that may be generated while the secondary battery is used may be reduced.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
a battery cell;
a frame unit surrounding the battery cell;
an adhesive portion overlapping the battery cell and the frame unit and attached to the battery cell; and
a label unit covering at least portions of the battery cell and the frame unit, at least a portion of the label unit overlapping the adhesive portion, wherein
the label unit includes a body portion and a plurality of extension portions extending from the body portion to cover a same side wall of the frame unit, and wherein
the plurality of extension portions of the label unit are separated from each other on the same side wall of the frame unit, wherein:
the label unit includes a first substrate layer and a first adhesive layer,
the first adhesive layer includes an opening area, and
the opening area is between the first substrate layer and at least a portion of the frame unit.

2. The secondary battery as claimed in claim 1, wherein the adhesive portion is attached to the battery cell and the frame unit.

3. The secondary battery as claimed in claim 1, wherein the adhesive portion includes:
a second substrate layer; and
a second adhesive layer between the second substrate layer and
the battery cell, or
the battery cell and the frame unit.

4. The secondary battery as claimed in claim 3, wherein the second substrate layer includes a polyimide based compound and the second adhesive layer includes a silicone based compound.

5. The secondary battery as claimed in claim 1, wherein the adhesive portion is attached to a first side of the battery cell.

6. The secondary battery as claimed in claim 5, wherein the adhesive portion is attached to a first side of the frame unit adjacent to the first side of the battery cell.

7. The secondary battery as claimed in claim 5, wherein the label unit is at least partially attached to the adhesive portion via the frame unit from a second side opposite to the first side of the battery cell.

8. The secondary battery as claimed in claim 7, wherein the label unit is attached to the second side of the battery cell.

9. The secondary battery as claimed in claim 7, wherein the label unit is at least partially not attached to the frame unit.

10. The secondary battery as claimed in claim 5, wherein:
at least a portion of the body portion is attached to a second side opposite to the first side of the battery cell, and
the plurality of extension portions are attached to the adhesive portion by covering the frame unit.

11. The secondary battery as claimed in claim 10, wherein some of the plurality of extension portions are attached to the adhesive portion and remaining ones of the plurality of extension portions are attached to the first side of the battery cell.

12. The secondary battery as claimed in claim 5, wherein the adhesive portion exposes at least a portion of the first side of the battery cell to outside.

13. The secondary battery as claimed in claim 1, comprising a space between the battery cell and the frame unit, wherein the adhesive portion covers the space.

14. The secondary battery as claimed in claim 1, wherein:
the plurality of extension portions of the label unit extend from the body portion of the label unit to cover the same side wall of the frame unit and a same side of the battery cell, and
the plurality of extension portions of the label unit are separated from each other on the same side of the battery cell.

15. The secondary battery as claimed in claim 1, wherein the first adhesive layer of the label unit is between a first side of the frame unit and the first substrate layer, and is not between a second side of the frame unit, opposite to the first side of the frame unit, and the first substrate layer of the label unit.

16. The secondary battery as claimed in claim 1, wherein the first adhesive layer of the label unit is between a first side of the frame unit and the first substrate layer of the label unit, and the first substrate layer of the label unit is not attached to a second side of the frame unit opposite to the first side of the frame unit.

17. The secondary battery as claimed in claim 1, wherein the first adhesive layer of the label unit is between a first side of the frame unit and the first substrate layer of the label unit, is not between a second side of the frame unit opposite to the first side of the frame unit and the first substrate layer of the label unit, and is not between a side surface of the frame unit connecting the first and second sides of the frame unit and the first substrate layer of the label unit.

* * * * *